US010394705B2

(12) United States Patent
Harding

(10) Patent No.: US 10,394,705 B2
(45) **Date of Patent: *Aug. 27, 2019**

(54) REGRESSION TESTING OF SQL EXECUTION PLANS FOR SQL STATEMENTS

(71) Applicant: International Business Machines Corporation, Armonk, NY (US)

(72) Inventor: Jonathan M. Harding, Bloomington, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,839

(22) Filed: May 16, 2018

(65) Prior Publication Data

US 2018/0260316 A1 Sep. 13, 2018

Related U.S. Application Data

(63) Continuation of application No. 15/089,773, filed on Apr. 4, 2016, now Pat. No. 9,990,275, which is a (Continued)

(51) Int. Cl.

*G06F 17/30* (2006.01)
*G06F 11/36* (2006.01)

(Continued)

(52) U.S. Cl.

CPC ...... *G06F 11/3692* (2013.01); *G06F 11/3684* (2013.01); *G06F 11/3688* (2013.01);

(Continued)

(58) Field of Classification Search

None

See application file for complete search history.

(56) References Cited

U.S. PATENT DOCUMENTS

| | | |
|---|---|---|
| 6,618,719 B1 | 9/2003 | Andrei |
| 7,185,000 B1 | 2/2007 | Brown et al. |

(Continued)

FOREIGN PATENT DOCUMENTS

| | | |
|---|---|---|
| WO | 2011145116 A3 | 11/2011 |

OTHER PUBLICATIONS

U.S. Appl. No. 14/196,586 Non-Final Office Action, dated Oct. 23, 2015, 5 pg.

(Continued)

*Primary Examiner* — Wilson Lee

(74) *Attorney, Agent, or Firm* — Cuenot, Forsythe & Kim, LLC

(57) ABSTRACT

A first execution plan for a first version of a structured query language statement can be requested from a database management system. The first execution plan for the first version of the structured query language statement can be loaded into a first directed graph tree structure comprising a plurality of nodes. The first directed graph tree structure can be scanned to determine whether a full table scan for accessing requested data is represented by at least a one of the plurality of nodes of the directed graph tree structure. Responsive to determining that the full table scan for accessing the requested data is represented by the at least one of the plurality of nodes of the directed graph tree structure, a first indicator that indicates a fault condition can be output.

14 Claims, 5 Drawing Sheets

Related U.S. Application Data continuation of application No. 14/196,586, filed on Mar. 4, 2014, now Pat. No. 9,317,414.

(51) Int. Cl.

| | |
|---|---|
| ***G06F 16/176*** | (2019.01) |
| ***G06F 16/903*** | (2019.01) |
| ***G06F 16/951*** | (2019.01) |
| ***G06F 16/22*** | (2019.01) |
| ***G06F 16/23*** | (2019.01) |
| ***G06F 16/2453*** | (2019.01) |
| ***G06F 16/21*** | (2019.01) |
| ***G06F 16/242*** | (2019.01) |
| ***G06F 16/25*** | (2019.01) |
| ***G06F 16/2455*** | (2019.01) |
| ***G06F 16/248*** | (2019.01) |

(52) U.S. Cl.

CPC ............ *G06F 16/176* (2019.01); *G06F 16/21* (2019.01); *G06F 16/2246* (2019.01); *G06F 16/2282* (2019.01); *G06F 16/235* (2019.01); *G06F 16/2365* (2019.01); *G06F 16/243* (2019.01); *G06F 16/248* (2019.01); *G06F 16/2453* (2019.01); *G06F 16/24542* (2019.01); *G06F 16/24564* (2019.01); *G06F 16/25* (2019.01); *G06F 16/903* (2019.01); *G06F 16/951* (2019.01)

(56) References Cited

U.S. PATENT DOCUMENTS

| | | | | |
|---|---|---|---|---|
| 9,317,414 | B2 * | 4/2016 | Harding | G06F 11/3688 |
| 9,582,409 | B2 | 2/2017 | Harding | |
| 9,990,275 | B2 * | 6/2018 | Harding | G06F 11/3688 |
| 10,176,088 | B2 | 1/2019 | Harding | |
| 2006/0112175 | A1 | 5/2006 | Sellers et al. | |
| 2008/0177922 | A1 | 7/2008 | Chow et al. | |
| 2010/0198809 | A1 | 8/2010 | Graefe et al. | |
| 2010/0198811 | A1 | 8/2010 | Wiener et al. | |
| 2011/0302583 | A1 | 12/2011 | Abadi et al. | |
| 2012/0078951 | A1 | 3/2012 | Hsu et al. | |
| 2012/0290527 | A1 | 11/2012 | Yalamanchilli | |
| 2014/0310259 | A1 | 10/2014 | Tian | |
| 2015/0242400 | A1 | 8/2015 | Bensberg et al. | |
| 2015/0254174 | A1 | 9/2015 | Harding | |
| 2015/0254295 | A1 | 9/2015 | Harding | |
| 2016/0217065 | A1 | 7/2016 | Harding | |

OTHER PUBLICATIONS

U.S. Appl. No. 14/196,586 Notice of Allowance, dated Dec. 16, 2015, 7 pg.

U.S. Appl. No. 14/494,907 Non-Final Office Action, dated Jun. 16, 2016, 26 pg.

U.S. Appl. No. 14/494,907 Notice of Allowance, dated Oct. 17, 2016, 8 pg.

U.S. Appl. No. 15/089,773, Non-Final Office Action, dated Sep. 8, 2017, 21 pg.

U.S. Appl. No. 15/089,773, Notice of Allowance, dated Jan. 31, 2018, 8 pg.

U.S. Appl. No. 15/418,211, Non-Final Office Action, dated Dec. 15, 2017, 13 pg.

U.S. Appl. No. 15/418,211, Final Office Action, dated Jul. 12, 2018, 5 pg.

U.S. Appl. No. 15/418,211, Notice of Allowance, dated Sep. 26, 2018.

* cited by examiner

300

| PLAN | COST | CARDINALITY | BYTES |
|---|---|---|---|
| SELECT STATEMENT | 6 | 3 | 189 |
| .NESTED LOOPS | 6 | 3 | 189 |
| ..NESTED LOOPS | 6 | 5 | 189 |
| ...HASH JOIN | 4 | 1 | 33 |
| ....TABLE ACCESS FULL PERSON_ROLES | 2 | 1 | 12 |
| ....BUFFER SORT | 2 | 1 | 21 |
| .....TABLE ACCESS BY INDEX ROWID DEPARTMENTS | 2 | 1 | 21 |
| ......INDEX RANGE SCAN DEPARTMENTS_IX1 | 1 | 1 | |
| ...INDEX RANGE SCAN PERSONS_IX1 | 1 | 5 | |
| ..TABLE ACCESS BY INDEX ROWID PERSONS | 2 | 2 | 60 |

REGRESSION TESTING OF SQL EXECUTION PLANS FOR SQL STATEMENTS

BACKGROUND

Arrangements described herein relate to regression testing of software that uses structured query language (SQL) statements.

SQL is a special-purpose programming language designed for managing data held in a relational database management system, and has become the most widely used programming language used for this purpose. SQL includes both a data definition language and a data manipulation language. The scope of SQL includes data insert, query, update and delete, schema creation and modification, and data access control. Although SQL is often described as, and to a large extent is, a declarative language, it also includes procedural elements.

SUMMARY

A system includes a processor programmed to initiate executable operations. The executable operations include requesting from a database management system a first execution plan for a first version of a structured query language statement. The first execution plan for the first version of the structured query language statement can be loaded into a first directed graph tree structure comprising a plurality of nodes. The first directed graph tree structure can be scanned to determine whether a full table scan for accessing requested data is represented by at least a one of the plurality of nodes of the directed graph tree structure. Responsive to determining that the full table scan for accessing the requested data is represented by the at least one of the plurality of nodes of the directed graph tree structure, a first indicator that indicates a fault condition can be output.

A computer program includes a computer readable storage medium having program code stored thereon. The program code is executable by a processor to perform a method. The method includes requesting, by the processor, from a database management system a first execution plan for a first version of a structured query language statement. The first execution plan for the first version of the structured query language statement can be loaded, by the processor, into a first directed graph tree structure comprising a plurality of nodes. The first directed graph tree structure can be scanned, by the processor, to determine whether a full table scan for accessing requested data is represented by at least a one of the plurality of nodes of the directed graph tree structure. Responsive to determining that the full table scan for accessing the requested data is represented by the at least one of the plurality of nodes of the directed graph tree structure, a first indicator that indicates a fault condition can be output by the processor.

BRIEF DESCRIPTION OF THE SEVERAL VIEWS OF THE DRAWINGS

FIG. 3 depicts an example tabular representation of a directed graph tree structure.

DETAILED DESCRIPTION

Figure 1:
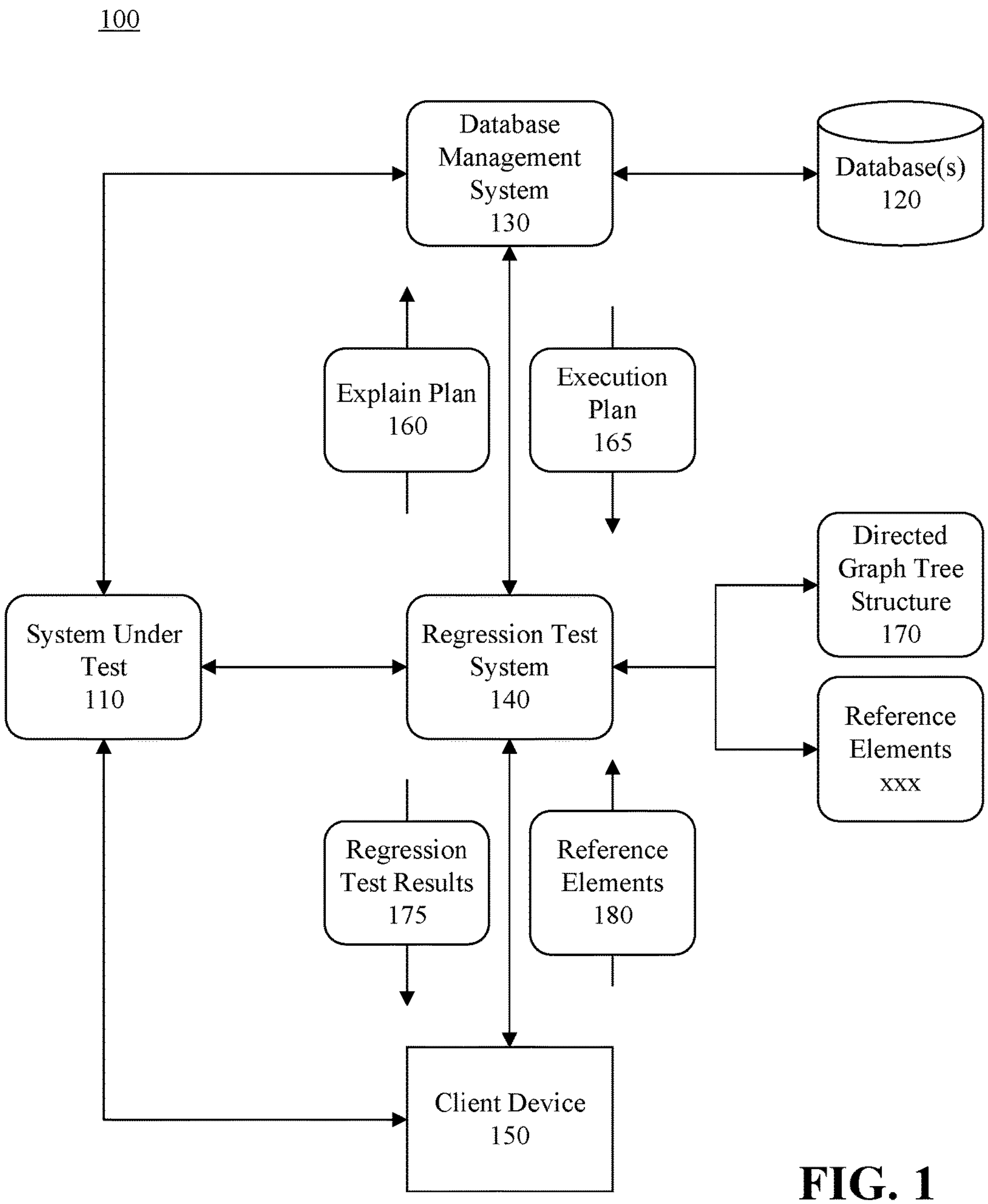
FIG. 1 is a block diagram illustrating an example of a computing environment in which regression testing is performed.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to regression testing of software that uses structured query language (SQL) statements and, more particularly, to regression testing of SQL execution plans for SQL statements. Such testing can be implemented as part of a quality assurance certification process performed on the software. In accordance with the inventive arrangements disclosed herein, a regression test system can perform regression testing on software that accesses a database using SQL statements. When doing so, the regression test system can, for each SQL statement used by the software, load an execution plan for the SQL statement into a directed graph tree structure. The regression test system can scan the directed graph tree structure to identify fault conditions and output corresponding regression test results. A user can review this information, as well as the directed graph tree structure, to gain insight on how to revise the SQL statement for better performance.

Several definitions that apply throughout this document now will be presented.

As defined herein, the term "regression test" means a test on software system that seeks to uncover new software bugs, known as regressions, in existing functional and non-functional areas of the software system after changes to the software system have been made. Examples of such changes include, but are not limited to, enhancements, patches and configuration changes.

As defined herein, the term "database management system" means software, or a suite of software, that manages a database, including storage, retrieval and updating of data in the database.

As defined herein, the term "explain plan" means a command, which identifies a SQL statement, communicated to a database management system to request an execution plan for the SQL statement. The explain plan does not actually cause the SQL statement to be executed.

As defined herein, the term "execution plan" means an ordered set of steps necessary to execute a SQL statement to access data in a database management system.

As defined herein, the term "directed graph structure" means a data structure representing a relationship between at least two elements, wherein the relationship is one-directional. The elements are represented as nodes in the directed graph structure. A directed graph structure may be represented pictorially or in a tabular format, for example in a table including columns and rows.

As defined herein, the term "directed graph tree structure" means a directed graph structure having a plurality of nodes arranged in a hierarchy, wherein each node represents an execution plan element. A directed graph tree structure may be represented pictorially or in a tabular format, for example in a table including columns and rows.

As defined herein, an "intermediate node" is a node in a directed graph tree structure that is a child node to at least one other node and that also is a parent node to at least one other node.

As defined herein, a "leaf node" is a node in a directed graph tree structure that is a child node to at least one other node and that is not a parent to any other node.

As defined herein, the term "database index" means is a data structure that includes a copy of select columns and/or rows of data from a data table. A database index is used to quickly locate data without having to search every row in a database table every time the database table is accessed. Use of a database index provides the basis for both rapid random lookups and efficient access of ordered records.

As defined herein, the term "cost" means a level of resources used, or anticipated to be used, in a step or level in an execution plan beyond an ideal level of resource usage.

As defined herein, the term "cardinality" means a measure of a number of elements retrieved from a set in comparison to the number of elements in the set that are accessed to retrieve the desired elements.

As defined herein, the term "Cartesian product" means a product of a plurality of sets. In illustration, for sets A and B, the Cartesian product $A \times B$ is the set of all ordered pairs (a, b) where $a \in A$ and $b \in B$.

As defined herein, the term "fault condition" means a condition that is undesirable.

As defined herein, the term "correlate" means matching. For example, a revised element correlates with a prior version of the element if a comparison of the revised element to the prior version the element indicates that the revised element matches the prior version of the element.

As defined herein, the term "correspond" means related. For example, a revised element corresponds to prior versions of the element. The revised element may or may not correlate with a prior version of the element.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller.

As defined herein, the term "automatically" means without user intervention.

As defined herein, the term "user" means a person (i.e., a human being).

FIG. 1 is a block diagram illustrating an example of a computing environment 100 in which regression testing is performed. The computing environment 100 can include a system under test (SUT) 110, one or more databases 120 in which data generated by and/or accessed by the SUT 110 are stored, a database management system 130, a regression test system 140, and at least one client device 150. The data base(s) 120 can include one or more data tables stored to one or more computer readable storage mediums. The SUT 110, database management system 130 and regression test system 140 can be implemented as applications or other software executing on one or more servers, each server including at least one or more processors and memory. In one arrangement, the regression test system 140 can be implemented as part of a test suite configured to test software systems. The client device 150 can be implemented as a processing system including one or more processors and memory, for example a workstation, a desktop computer, a mobile computer (e.g., a laptop computer, a notebook computer, a netbook computer, a tablet computer, etc.), a smart phone, or the like.

The client device 150 can be communicatively linked to the server(s) hosting the SUT 110, the regression test system 140 and the database management system 130 via one or more communication networks. Similarly, various servers hosting the SUT 110, regression test system 140 and database management system 130 can be communicatively linked via the communication network. The database management system 130 can be communicatively linked to the computer readable storage medium(s) on which the database(s) 110 is/are stored via the communication networks, or can be communicatively linked to the computer readable storage medium(s) via a system bus or other suitable communication hardware.

The communication network is the medium used to provide communications links between various devices and data processing systems connected together within network data processing system (or computing environment) 100. The communication network may include connections, such as wire, wireless communication links, or fiber optic cables. The communication network can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

In operation, the regression test system 140 can initiate regression testing on the SUT 110. The regression testing can commence in response to a user request or automatically begin at a scheduled time. During the regression test, the regression test system 140 can identify each SQL statement used by the SUT 110 to access data from the database 120 via the database management system 130. For each SQL statement, the regression test system 140 can communicate the SQL statement to the database management system 130, using the explain plan command 160, to request the execution plan 165 for the respective SQL statement. In one arrangement, the regression test system 140 can sequentially process the execution plans 165, communicating each new SQL statement to the database management system 130 when processing of a previous execution plan 165 is complete. The present arrangements are not limited in this regard, however.

Responsive to receiving an execution plan 165, the regression test system can load the execution plan 165 into a directed graph tree structure 170. The regression test system 140 can store the directed graph tree structure 170 to a computer readable storage medium. For example, the directed graph tree structure 170 can be stored in random access memory (RAM), at least temporarily, while the directed graph tree structure 170 is being processed. Further, the directed graph tree structure 170 can be persisted to non-volatile memory, such as one or more hard disk drives (HDDs), solid state drives (SDDs) or the like. In one arrangement, the directed graph tree structure 170 can be stored to a database, such as the database 120 or another suitable database.

Figure 2:
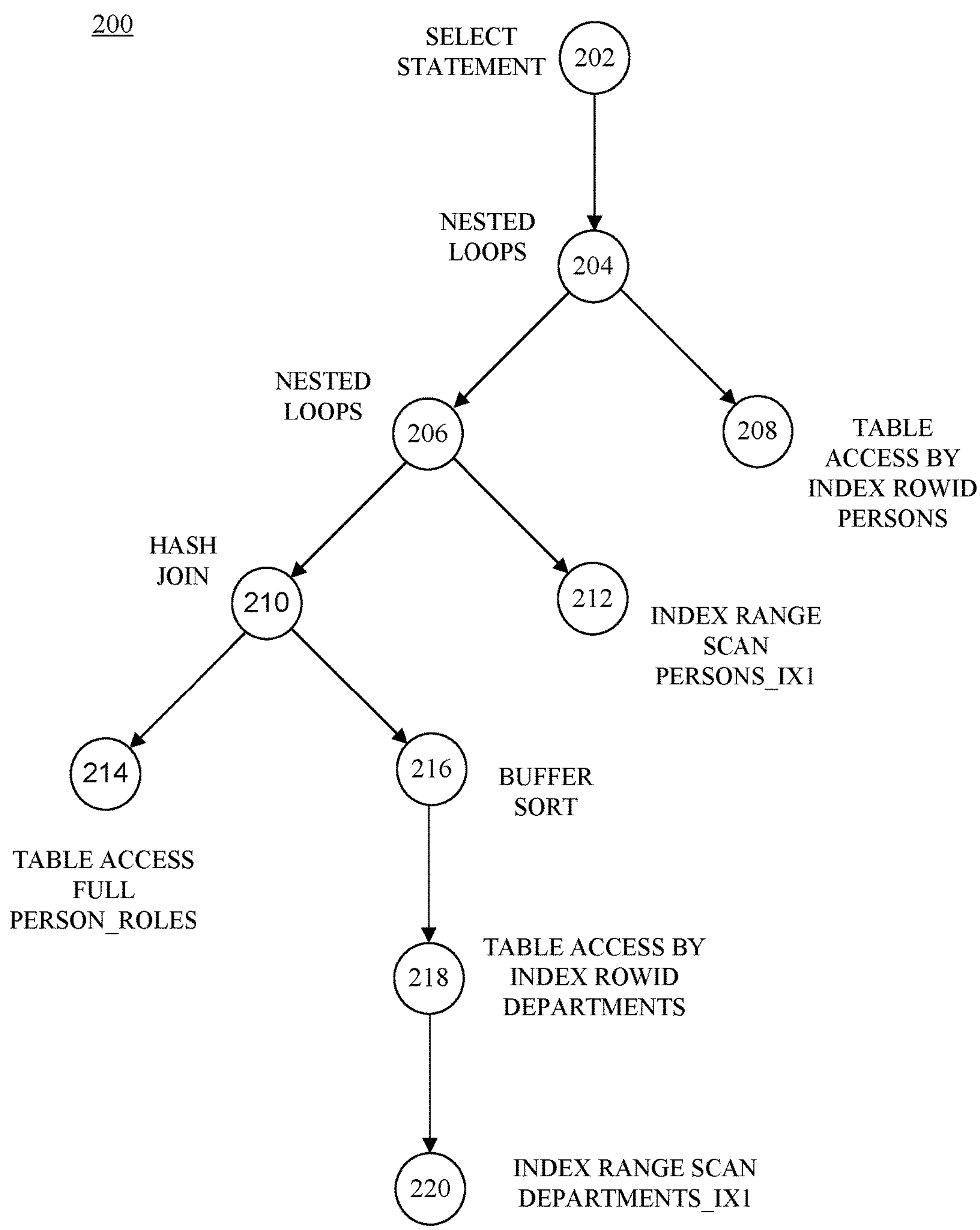
FIG. 2 depicts an example pictorial representation of a directed graph tree structure.

FIG. 2 depicts an example pictorial representation 200 of a directed graph tree structure, such as the directed graph tree structure 170, representing the following example SQL statement:

```
select p.person_id, p.last_name, p.first_name, d.department_name,
pr.person_role_name from persons p, departments d, person_roles pr
where p.department_id = d.department_id and p.person_id =
pr.person_id;
```

The directed graph tree structure 170 can include a plurality of nodes 202, 204, 206, 208, 210, 212, 214, 216, 218, 220 arranged in a hierarchy. Each node 202-220 represents a particular element (e.g., process) contained in the execution plan, such as the execution plan 165 of FIG. 1, for the example SQL statement.

The node 202 is a parent node to node 204, and the node 204 is a child node to the node 202. Similarly, the node 204 is a parent node to nodes 206, 208, and the nodes 206, 208 are children nodes to the node 204. The node 206 is a parent node to nodes 210, 212, and the nodes 210, 212 are children nodes to the node 206. The node 210 is a parent node to nodes 214, 216, and the nodes 214, 216 are children nodes to the node 210. The node 216 is a parent node to node 218, and the node 218 is a child node to node 216. The node 218 is a parent node to node 220, and the node 220 is a child node to node 218.

Since the nodes 208, 212, 214, 220 are children to other nodes, but not parents to any other nodes, the nodes 208, 212, 214, 220 are leaf nodes. Since the nodes 204, 206-210 and 216-218 are children to other nodes, while also being parents to other nodes, the nodes 204, 206-210 and 216-218 are intermediate nodes. The intermediate nodes 204, 206-210 and 216-218 represent intermediate results of query processes contained in the execution plan 165.

Referring both to FIG. 1 and FIG. 2, the leaf nodes 208, 212, 214, 220 and intermediate node 218 represent table accesses contained in the execution plan 165. The table accesses are accesses to one or more tables contained in the database(s) 120. For example, node 214 can represent a full table scan, and nodes 208, 218 can represent table accesses using database indexes. Nodes 212, 220 can represent range scans of database indexes.

FIG. 3 depicts a tabular representation 300 of a directed graph tree structure, such as the directed graph tree structure 170, representing the example SQL statement discussed with reference to FIG. 2. The tabular representation 300 can be presented as a data table including columns and rows, though this need not be the case. The tabular representation 300 of the directed graph tree structure 170 can include the nodes 202-220 described with respect to FIG. 2 presented in a tabular format.

The tabular representation 300 can indicate, for each node 202-220, a level 310 in the hierarchy the node 202-220 is positioned, for example using spacing and/or characters (e.g., dots, periods, symbols, letters and/or numerals). The tabular representation 300 also can include an identifier 315 indicating a type of element (e.g., process) represented by each respective node 202-220, an identifier 320 indicating the cost incurred by each respective element, an identifier 325 indicating the cardinality of each respective element, and an identifier 330 indicating the amount of data processed at each respective element. The tabular representation 300 also can include other identifiers and/or data related to the elements represented by the respective nodes 202-220, and the present arrangements are not limited in this regard.

Referring again to FIG. 1, the regression test system 140 can perform one or more scans of the directed graph tree structure 170 to determine whether any fault conditions exist in the execution plan 165. One example of a scan is a depth-first scan in which the regression test system 140 traverses the nodes of the directed graph tree structure 170 to identify the nodes 208, 212, 214, 218, 220 (FIGS. 2 and 3) where table accesses occur and determine whether a full table scan to access requested data is represented by one or more of the nodes 208, 212, 214, 218, 220. In one arrangement, only leaf nodes 208, 212, 214, 220 need be traversed since full table scans typically are represented by leaf nodes. If a full table scan to access the requested data is represented by one or more of the nodes 208, 212, 214, 218, 220, the regression test system 140 can generate and output an indicator indicating a fault condition for such nodes 208, 212, 214, 218, 220. For instance, in the present example, a fault can be indicated for node 214. The fault condition can indicate to a user to revise the SQL statement represented by the execution plan 165 to use the available database index in lieu of performing a full table scan.

In another arrangement, the regression test system 140 can determine, for any nodes representing a full table scan, such as the node 214, whether a database index is available for use in accessing requested data in lieu of the full table scan. If a full table scan to access requested data is represented by one or more of the nodes 208, 212, 214, 218, 220, and a database index is available for use in accessing the requested data in lieu of the full table scan, the regression test system 140 can generate and output an indicator indicating a fault condition for such nodes 208, 212, 214, 218, 220. The regression test system 140 also can output an indicator which indicates the database index that is available for accessing the requested data.

Another example of a scan is a breadth-first scan in which the regression test system 140 determines the costs incurred by intermediate processing represented by the intermediate nodes 204, 206-210 and 216-218 (FIGS. 2 and 3), and determine whether the costs are excessive. Excessive costs can be incurred, for example, if a Cartesian product is performed where the Cartesian product is not required to retrieve data, excessive resources are used to optimize implementation of SQL statements, if there are a number row accesses that exceed, by a threshold value, the number of row accesses required to retrieve requested data, and the like. In this regard, the cardinality of data accesses can be evaluated. In illustration, with respect to the number of row accesses being performed, cost can be calculated by the following equation:

$$\frac{RA - RR}{RA}$$

where RA=the number of rows of data accessed and RR=the number of rows from which data is retained. By way of example, if one thousand rows of a data table are accessed to retrieve data satisfying a SQL statement (RA=1,000), but data from only two hundred of those rows is retained (RR=200), the cost is eighty percent (80%) or, more simply, eighty (80). If the costs are excessive for any of the intermediate nodes 204-210, the regression test system 140 can generate and output an indicator indicating a fault condition for such intermediate node(s) 204-210. For example, a threshold cost, or cardinality, of seventy five percent (75%) can be established, and any costs exceeding this threshold value can trigger the indicator indicating the fault condition. In some cases, a lower threshold can be established to avoid false positives on smaller tables. The fault condition can indicate to a user to revise the SQL statement represented by the execution plan 165 to streamline the manner in which data is accessed and/or processed.

In this regard, if a database index is available to reduce the number of rows that are searched, the SQL statement can be revised to use the database index to make the search more efficient. A where clause also can be used in the SQL statement to make the search more efficient, though it may not be as efficient if a database index is not available. In illustration, assume a SQL statement includes "Select last_name, first_name, date_of_birth from persons where last_name like 'H*'." The results of processing this SQL statement would be different, and more efficient, if a database index is available. If there is not a database index available, the database management system 130 would need to visit every row in the appropriate table in order to find those whose last names began with "H." In this case, the database management system 130 may, for example, access one thousand (1,000) rows of last_name data to retrieve last_name data from two hundred (200) rows. Having a database index on last_name beginning with "H" allows the database management system 130 to position itself in the index at the first entry starting with "H" and traverse the rows via the index until the last "H" entry is encountered. In this case, only two hundred (200) rows of last_name data would be accessed, which is much more efficient than searching through all rows in a table to identify each last-name entry beginning with "H."

Responsive to completing the scan(s) of the directed graph tree structure 170, the regression test system 140 can select a next SQL statement to analyze and repeat the above processes for that SQL statement. The regression test system 140 can continue doing so until all SQL statements contained in the SUT 110 have been analyzed, until a desired number of SQL statements have been analyzed, until all SQL statements pre-selected for analysis have been analyzed, or until a specified period of time has elapsed since the regression test system 140 initiated the testing.

Regression test results 175 can be generated and output for each execution plan 165 indicating the SQL statement represented by the execution plan 165, indicating any fault conditions that are identified in the execution plan 165 and the corresponding elements, and indicating elements which passed the regression testing. In one arrangement, the regression test results 175 for each execution plan 165 can be aggregated into a single report, though this need not be the case. In one aspect, the regression test results 175 for each execution plan 165 can include the directed graph tree structure 170, either in pictorial format or in tabular format. Within the directed graph tree structure 170 presented in the regression test results 175, pass/fail results of each element can be indicated, as well as any fault conditions identified for respective ones of the elements. Further, the costs incurred at each element that is an intermediate result (i.e., elements represented by nodes 204-210) can be indicated with the respective elements in the directed graph tree structure 170 presented in the regression test results 175.

The regression test results 175 can be persisted to a computer readable storage medium, for example to a data table in the database 120 or another suitable database. A user of the client device 150 can receive the regression test results 175 from the regression test system 140 via the client device 150. In one arrangement, the regression test results 175 presented to the user can be limited to the regression test results 175 for execution plans 165 in which fault conditions were identified. In another arrangement, the all regression test results 175 can be presented to the user, or the user can select certain regression test results 175 to review. Accordingly, the user can quickly and easily review the regression test results 175 to determine which SQL statements should be revised to resolve errors and/or improve efficiency in the operation of the SUT 110. After the SQL statements have been revised, the regression testing described above can again be performed on the SQL statements used by the SUT 110, or only on the SQL statements that were revised, and corresponding regression test results 175 can be generated on the SQL statements that were again tested.

In a further aspect of the present arrangements, the directed graph tree structures 170, for example the directed graph tree structures 170 for execution plans that have passed the regression testing, can be retained as reference (or benchmark) elements 180. Execution plans 165 for SQL statements, including revised SQL statements, used by future versions of the SUT 110 can be compared to the reference elements 180. In another arrangement, a user can select specific elements from execution plans 165 known to have passed regression testing and save those elements as the reference elements 180. In this arrangement, elements of execution plans 165 for SQL statements, including revised SQL statements, used by future versions of the SUT 110 can be compared to the reference elements 180.

At some point in time the SUT 110 may be revised. When the regression test system 140 performs regression testing on the revised version of the SUT, the regression test system 140 can compare execution plans 165 generated for the revised version of the SUT 110 to corresponding reference elements 180. In illustration, a particular execution plan 165 can be compared to a reference directed graph tree structure generated for a corresponding execution plan. If the execution plan 165 correlates to the reference graph tree structure, the execution plan 165 can be considered to have passed regression testing, and a new directed graph tree structure 170 need not be generated. In one arrangement, if the execution plan 165 does not correlate to the reference graph tree structure, a fault condition indicator can be generated and output by the regression test system 140. In another arrangement, if the execution plan 165 does not correlate to the reference graph tree structure, a new directed graph tree structure 170 can be generated for the execution plan 165. That directed graph tree structure 170 can be scanned by the regression test system 140 to identify any fault conditions that may exist in the execution plan 165 and regression test results 175 can be generated and output, as previously described.

In another example, elements of a particular execution plan 165, which correspond to specific elements saved as reference elements 180, can be compared to the reference elements 180. If the elements of the execution plan 165 do not correlate to the reference elements 180, a fault condition indicator can be generated and output. In illustration, use of a certain database index may be a reference element 180. If, the execution plan 165 does not include that reference element 180, a fault condition can be indicated. Similarly, cardinality of accessing data from a certain table or tables may be important and indicated by a reference element 180. If the execution plan does not include that reference element 180, a fault condition can be indicated.

If no fault conditions are found in an execution plan for a particular SQL statement, a user can select key elements of the execution plan and save those elements as reference elements. At some point in time the SQL statement may be revised. When regression testing is performed on the revised version of the SQL statement, a determination can be made whether the reference elements 180 are contained in the directed graph tree structure into which the execution plan for the revised SQL statement is loaded. If any of the reference elements are missing, a fault can be output, thereby alerting a user that there is a defect in the revised version of the SQL statement.

Figure 4:
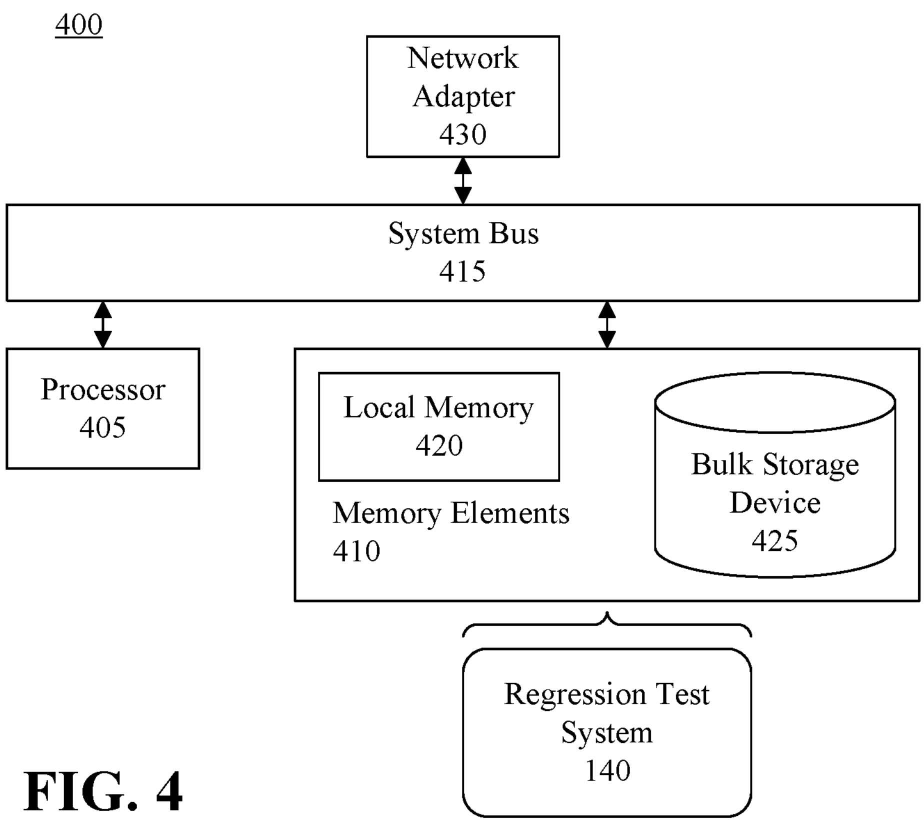
FIG. 4 is a block diagram illustrating example architecture for a processing system.

FIG. 4 is a block diagram illustrating example architecture for a processing system 400. The processing system 400 can be implemented as a server hosting the regression test system 140. The processing system 400 also can host the database management system 130 and/or the SUT 110, or such components can be hosted on similarly processing systems.

The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, a tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

One or more network adapters 430 also can be coupled to processing system 400 to enable processing system 400 to become coupled to other systems, computer systems, remote printers, and/or remote storage devices through intervening private or public networks. Modems, cable modems, transceivers, and Ethernet cards are examples of different types of network adapters 430 that can be used with the processing system 400.

As pictured in FIG. 4, the memory elements 410 can store the regression test system 140. Being implemented in the form of executable program code, the regression test system 140 can be executed by the processing system 400 and, as such, can be considered part of the processing system 400. Moreover, the regression test system 140 is a functional data structure that imparts functionality when employed as part of the processing system 400. The execution plan 165, directed graph tree structure 170 and reference elements 180 depicted in FIG. 1 also are functional data structures that impart functionality when processed by the regression test system 140 executed by the processing system 400.

Figure 5:
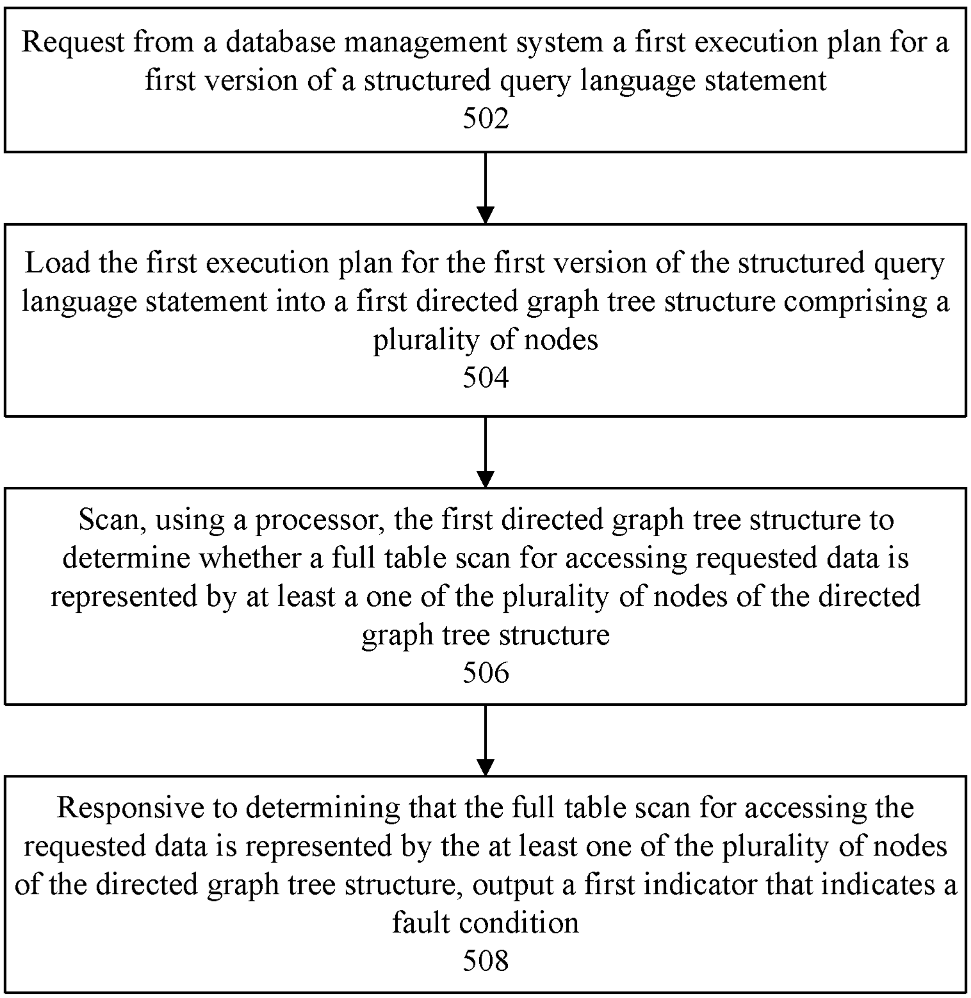
FIG. 5 is a flow chart illustrating an example of a method of performing regression testing.

FIG. 5 is a flow chart illustrating an example of a method 500 of performing regression testing. At step 502 a first execution plan for a first version of a structured query language statement can be requested from a database management system. At step 504, the first execution plan for the first version of the structured query language statement can be loaded into a first directed graph tree structure comprising a plurality of nodes. At step 506, the first directed graph tree structure can be scanned to determine whether a full table scan for accessing requested data is represented by at least a one of the plurality of nodes of the directed graph tree structure. At step 508, responsive to determining that the full table scan for accessing the requested data is represented by the at least one of the plurality of nodes of the directed graph tree structure, a first indicator that indicates a fault condition can be output.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. Moreover, as used herein, ordinal terms (e.g. first, second, third, fourth, fifth, sixth, seventh, eighth, ninth, tenth, and so on) distinguish one node, element, version, execution plan, structure, or the like from another node, element, version, execution plan, structure, or the like. Thus, an ordinal term used herein need not indicate a specific position in an ordinal series or hierarchy. For example, a node identified as a "first node" may occur below one or more other nodes in a hierarchy. Moreover, one or more nodes may occur between a first node and a second node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor programmed to initiate executable operations comprising:

requesting from a database management system a first execution plan for a first version of a structured query language statement;

loading the first execution plan for the first version of the structured query language statement into a first directed graph tree structure comprising a plurality of nodes;

scanning the first directed graph tree structure to determine whether a full table scan for accessing requested data is represented by at least a one of the plurality of nodes of the directed graph tree structure;

responsive to determining that the full table scan for accessing the requested data is represented by the at least one of the plurality of nodes of the directed graph tree structure, outputting a first indicator that indicates a fault condition;

requesting from the database management system a second execution plan for a second version of the structured query language statement;

loading into a second directed graph tree structure the second execution plan for the second version of the structured query language statement;

determining whether any fault conditions are identified in the second execution plan; and responsive to determining that no fault conditions are identified in the second execution plan, outputting a second indicator that indicates the second execution plan has no faults.

2. The system of claim 1, the executable operations further comprising:

determining whether a database index is available for the accessing the requested data in lieu of the full table scan;

wherein outputting a first indicator that indicates a fault condition further is responsive to determining that the database index is available for accessing the requested data.

3. The system of claim 1, wherein the plurality of nodes comprise at least one intermediate node, the intermediate node representing intermediate results of a query process contained in the first execution plan, the executable operations further comprising:

scanning the first directed graph tree structure to determine a cost incurred by the intermediate results of the query process represented by the intermediate node; and outputting a second indicator that indicates the cost incurred by the intermediate results of the query process represented by the intermediate node.

4. The system of claim 3, wherein the cost incurred by the intermediate results is a cost of generating a Cartesian product that is not required to retrieve data corresponding to the structured query statement.

5. The system of claim 3, the executable operations further comprising:

indicating in the first directed graph tree structure the cost incurred by the intermediate results of the query process represented by the intermediate node.

6. The system of claim 1, the executable operations further comprising:

receiving from a user a selection of elements from the second execution plan;

storing the selected elements from the second execution plan as reference elements;

requesting from the database management system a third execution plan for a third version of the structured query language statement;

determining whether the reference elements are included in the third execution plan; and responsive to determining that the reference elements are not included in the third execution plan, outputting a third indicator that indicates a fault condition.

7. The system of claim 1, the executable operations further comprising:

storing the second directed graph tree structure as a reference directed graph tree structure;

requesting from the database management system a third execution plan for a third version of the structured query language statement;

determining whether the third execution plan correlates to the reference directed graph tree structure; and responsive to determining that the third execution plan does not correlate to the reference directed graph tree structure, outputting a third indicator that indicates a fault condition.

8. A computer program product comprising a computer readable storage medium having program code stored thereon, the program code executable by a processor to perform a method comprising:

requesting, by the processor, from a database management system a first execution plan for a first version of a structured query language statement;

loading, by the processor, the first execution plan for the first version of the structured query language statement into a first directed graph tree structure comprising a plurality of nodes;

scanning, by the processor, the first directed graph tree structure to determine whether a full table scan for accessing requested data is represented by at least a one of the plurality of nodes of the directed graph tree structure;

responsive to determining that the full table scan for accessing the requested data is represented by the at least one of the plurality of nodes of the directed graph tree structure, outputting, by the processor, a first indicator that indicates a fault condition;

requesting from the database management system a second execution plan for a second version of the structured query language statement;

loading into a second directed graph tree structure the second execution plan for the second version of the structured query language statement;

determining whether any fault conditions are identified in the second execution plan; and responsive to determining that no fault conditions are identified in the second execution plan, outputting a second indicator that indicates the second execution plan has no faults.

9. The computer program product of claim 8, wherein the plurality of nodes comprise at least one intermediate node, the intermediate node representing intermediate results of a query process contained in the first execution plan, the method further comprising:
scanning the first directed graph tree structure to determine a cost incurred by the intermediate results of the query process represented by the intermediate node; and
outputting a second indicator that indicates the cost incurred by the intermediate results of the query process represented by the intermediate node.

10. The computer program product of claim 8, the method further comprising:
receiving from a user a selection of elements from the second execution plan;
storing the selected elements from the second execution plan as reference elements;
requesting from the database management system a third execution plan for a third version of the structured query language statement;
determining whether the reference elements are included in the third execution plan; and
responsive to determining that the reference elements are not included in the third execution plan, outputting a third indicator that indicates a fault condition.

11. The computer program product of claim 8, the method further comprising:
storing the second directed graph tree structure as a reference directed graph tree structure;
requesting from the database management system a third execution plan for a third version of the structured query language statement;
determining whether the third execution plan correlates to the reference directed graph tree structure; and
responsive to determining that the third execution plan does not correlate to the reference directed graph tree structure, outputting a third indicator that indicates a fault condition.

12. The computer program product of claim 8, the method further comprising:
determining whether a database index is available for the accessing the requested data in lieu of the full table scan;
wherein outputting a first indicator that indicates a fault condition further is responsive to determining that the database index is available for accessing the requested data.

13. The computer program product of claim 9, wherein the cost incurred by the intermediate results is a cost of generating a Cartesian product that is not required to retrieve data corresponding to the structured query statement.

14. The computer program product of claim 9, the method further comprising:
indicating in the first directed graph tree structure the cost incurred by the intermediate results of the query process represented by the intermediate node.

* * * * *